United States Patent
Waters et al.

(10) Patent No.: US 10,791,714 B2
(45) Date of Patent: Oct. 6, 2020

(54) CLASP

(71) Applicant: Michael Neville Waters, Townsville (AU)

(72) Inventors: Michael Neville Waters, Townsville (AU); Scot Farley, Townsville (AU)

(73) Assignee: Michael Neville Waters, Kirwan, QLD (AU)

( * ) Notice: Subject to any disclaimer, the term of this patent is extended or adjusted under 35 U.S.C. 154(b) by 308 days.

(21) Appl. No.: 15/512,593

(22) PCT Filed: Sep. 23, 2015

(86) PCT No.: PCT/AU2015/050573
§ 371 (c)(1),
(2) Date: Mar. 20, 2017

(87) PCT Pub. No.: WO2016/044894
PCT Pub. Date: Mar. 31, 2016

(65) Prior Publication Data
US 2017/0290302 A1    Oct. 12, 2017

(30) Foreign Application Priority Data
Sep. 24, 2014    (AU) ................ 2014903819

(51) Int. Cl.
*A01K 27/00*    (2006.01)
*A41F 9/02*    (2006.01)
*A44B 11/12*    (2006.01)
*A44C 15/00*    (2006.01)

(52) U.S. Cl.
CPC .......... *A01K 27/005* (2013.01); *A01K 27/001* (2013.01); *A41F 9/02* (2013.01); *A41F 9/025* (2013.01); *A44B 11/125* (2013.01); *A44C 15/00* (2013.01)

(58) Field of Classification Search
CPC ....... A01K 27/00; A01K 27/001; A41F 1/008; A41F 9/02; A41F 9/025
USPC ......... 119/856, 863, 865; 24/31 R, 32, 33 R, 24/68 E, 68 R
See application file for complete search history.

(56) References Cited

U.S. PATENT DOCUMENTS

| 5,572,747 | A | 11/1996 | Cheng | |
| 9,241,543 | B1* | 1/2016 | Peng | A44B 11/008 |
| 9,351,526 | B1* | 5/2016 | Taylor | A44B 11/12 |
| 2002/0189056 | A1* | 12/2002 | Gallina | A44B 11/12 24/68 R |

(Continued)

OTHER PUBLICATIONS

International Search Report and Written Opinion of international Search Authority issued in PCT Application No. PCT/AU2015/050573 dated Dec. 18, 2015.

*Primary Examiner* — David J Parsley
(74) *Attorney, Agent, or Firm* — Piloff Passino & Cosenza LLP; Sean A. Passino; Rachel K. Piloff

(57) ABSTRACT

A clasp is provided having a body defining at least one passageway extending at least partially therethrough, at least one pair of engagement portions pivotally mounted across the body and configured to engage an object located in the at least one passageway, and an actuation portion in communication with the at least one pair of engagement portions and biased in the engaged condition. Actuation of the actuation portion causes the at least one pair of engagement portions to disengage from the object against the biasing force.

20 Claims, 4 Drawing Sheets

(56) References Cited

U.S. PATENT DOCUMENTS

| | | | |
|---|---|---|---|
| 2003/0037417 A1* | 2/2003 | Shen | F16G 11/101 |
| | | | 24/334 |
| 2011/0185983 A1 | 8/2011 | Waters | |
| 2012/0297591 A1* | 11/2012 | Bozzetto | A43C 11/146 |
| | | | 24/68 SK |
| 2014/0157626 A1* | 6/2014 | Briggs | A43C 11/146 |
| | | | 36/83 |
| 2014/0224190 A1 | 8/2014 | Waters | |

\* cited by examiner

CLASP

CROSS REFERENCE TO RELATED APPLICATIONS

This application is a U.S. national stage application under 35 U.S.C. § 371 of PCT Application No. PCT/AU2015/050573 filed on Sep. 23, 2015, which claims the benefit of Australian Provisional Application No. 2014903819 filed on Sep. 24, 2014. The subject matter of these earlier filed patent applications is hereby incorporated by reference in its entirety.

TECHNICAL FIELD

The present invention relates to a clasp. In particular, the present invention relates to a clasp for use with such devices as collars, belts or tie-downs.

BACKGROUND ART

Clasps are used for a wide variety of applications, such as collars for animals, safety belts (or other safety devices), clothing, tie-downs on trucks and other vehicles and so on. However, existing clasps suffer from the drawback that, if the same device is used by two different people, it will most likely need to be adjusted so as to fit the second person. This is fiddly, time-consuming and may result in, for instance, excess lengths of belt dangling from the device which is both unsightly and potentially hazardous.

Similarly, due to the nature of existing clasps, animal collars or belts for clothing are constructed in particular sizes, meaning that as a person or animal grows, the belt or collar must either be adjusted manually (e.g. by adding additional holes to the belt or collar) or replaced if the belt or collar becomes too small for the person or animal.

Some attempts have been made to overcome these drawbacks. For instance, in the Applicant's earlier international patent application (published as WO 2009/121146) a clasp was provided that allowed for quick adjustment. However, while this clasp provide ease of adjustment in one direction (i.e. to tighten the collar or belt), it was more difficult to adjust in the opposite direction (i.e. to loosen the collar or belt). When used as an animal collar, this could potentially lead to a situation in which the collar is pulled so tight that the animal may find it difficult to breathe.

Thus, there would be an advantage if it were possible to provide a clasp which allowed a belt, collar or other similar device to be easily and quickly adjusted (both tightening and loosening) when the same device is used by people or animals of different size.

It will be clearly understood that, if a prior art publication is referred to herein, this reference does not constitute an admission that the publication forms part of the common general knowledge in the art in Australia or in any other country.

SUMMARY OF INVENTION

The present invention is directed to a clasp which may at least partially overcome at least one of the abovementioned disadvantages or provide the consumer with a useful or commercial choice.

With the foregoing in view, the present invention in one form, resides broadly in a clasp having a body defining at least one passageway extending at least partially therethrough, at least a pair of engagement portions pivotally mounted across the body and adapted to engage an object located in said at least one passageway, and an actuation portion in communication with the at least a pair of engagement portions and biased in the engaged condition, wherein actuation of the actuation portion causes the at least a pair of engagement portions to disengage from the object against the biasing force.

In use, the clasp of the present invention will typically be used in association with an elongate flexible member. Importantly, the clasp of the invention may be fixed to a portion of the elongate flexible member or alternatively, may be at least temporarily fixed in position via the engagement portions only. The clasp may be removable from the elongate flexible member entirely and the elongate flexible member may be moved through the at least one passageway with or without restriction apart from the engagement portions.

Typically, the clasp will be used in one of two main situations, namely, more or less permanently attached to an end of the elongate member with another portion of the member engaged by the engagement portions or alternatively, as a clasp which is fixed in position by the engagement portions along the length of the elongate member.

The body of the clasp may be of any suitable shape, size or configuration. In some embodiments of the invention, the body of the clasp comprises one or more walls, the interior of the one or more walls of the body serving to define at least one passageway extending at least partially therethrough. In a preferred embodiment of the invention, the body of the clasp comprises a bottom wall and a pair of sidewalls extending therefrom.

Preferably, the body of the clasp comprises one or more inlets into which an object may be inserted. In some embodiments of the invention, the body of the clasp further comprises one or more outlets. Thus, in these embodiments of the invention, the at least one passageway extends entirely through the body of the clasp, with the at least one inlet defining one end of the passageway and the at least one outlet defining a second end of the passageway. Whilst the passageway may be of any suitable configuration (curved, tortuous or the like), it is preferred that the passageway is substantially straight.

The actuation portion may be of any suitable form. As previously stated, the actuation portion is in communication with the engagement portions, and the communication between the actuation portion and the engagement portions may be achieved using any suitable technique. The actuation portion may communicate either directly or indirectly with the engagement portions. For instance, the actuation portion may be located remotely from the engagement portions (or even remotely from the clasp), or the actuation portion and the engagement portions may be physically connected to one another, either temporarily or permanently.

In some embodiments of the invention, the actuation portion comprises a lever, button, switch, latch, or the like. The actuation portion may be located remotely from the clasp or may be mounted permanently or temporarily to the body of the clasp. The actuation portion may be formed integrally with the body of the clasp or may be formed separately and subsequently mounted thereto using any suitable technique. In some embodiments of the invention, at least a portion of the actuation portion may form at least a portion of an upper wall of the body of the clasp.

In a preferred embodiment of the invention, the actuation portion is biased in the engaged condition. By this it is meant that, when the actuation portion is not being actuated, the actuation portion is biased such that the engagement portions are in position to engage an object. Preferably, when the engagement portions are in position to engage an object, the engagement portions are located within the passageway. In some embodiments of the invention, when the engagement portions are located in the passageway (i.e. when the actuation portion is in the biased condition), the passageway may be at least partially blocked by the engagement portions. Preferably, when the engagement portions are located in the passageway, an object cannot pass through the passageway due to the obstacle caused by the location of the engagement portions. The actuation portion may be biased in this condition using any suitable biasing member (or members), such as a compressible tube or the like. In a preferred embodiment of the invention, however, the biasing member comprises one or more springs.

In a preferred embodiment of the invention, the biasing force of the biasing member may be overcome by manual pressure applied by a user's fingers or hands. However, depending on the application to which the invention is applied, it may be preferable that a greater (or lesser) force than this is required to overcome the biasing force and actuate the actuation portion.

In some embodiments of the invention, actuation of the actuation portion may result in the engagement portions moving such that they no longer obstruct the passageway. In this way, upon actuation of the actuation portion, an object may be inserted into, and pass through, the passageway. When the actuation of the actuation portion is released, the actuation portion is biased so as to return the engagement portions to the engaged condition within the passageway, whereupon, if an object has been inserted into the passageway, the engagement portions engage with said object to retain it in place. In some embodiments of the invention, this movement of the engagement portions is achieved by mounting the engagement portions and the actuation portion so as to be pivotally mounted to the body of the clasp. Thus, actuation of the actuation portion causes the engagement portions to pivot about a pivot point such that the engagement portions are pivoted out of the passageway.

In some embodiments of the invention, the actuation portion may be provided with one or more indicia to instruct a user in how to actuate the actuation portion. The one or more indicia may be in the form of words, letters, numbers, symbols, pictures, colours or any combination thereof.

The at least a pair of engagement portions may be of any suitable form to create a sufficient engagement between the engagement portions and the object to prevent the object from moving without the engagement portions being disengaged. The physical engagement may be achieved using any suitable technique such as by abutting, a frictional engagement, a pin and slot arrangement, a clamping motion or a combination thereof.

The engagement portions may be provided with one or more projections (teeth, hooks, spikes or the like), an adhesive, Velcro or the like (or any combination thereof) that may physically engage and hold the object during use.

In some embodiments of the invention, the engagement portions may include an array of projections. The array of projections may be provided on a member that extends transversely across at least a portion of the passageway. When the engagement portions are in the engaged position, the array of projections may extend at least partially into the passageway. In this way, the array of projections may engage with at least a portion of the width of an object located in the passageway. Preferably, each of the engagement portions is provided with an array of projections.

In a preferred embodiment of the invention, the actuation of the actuation portion may cause the array of projections to move such that the array of projections does not project into the passageway. In this manner, the array of projections may be disengaged from the object located in the passageway so that the object may be removed from the passageway or have its position adjusted. In addition, by moving the array of projections out of the passageway, an object may be inserted into the passageway if required.

In a preferred embodiment of the invention, the member on which the array of projections is provided may be in communication with the actuation portion. Preferably, the member is connected, either fixedly or removably, or directly or indirectly, to the actuation portion.

The pair of engagement portions may be oriented in any suitable manner within the body of the clasp. For instance, the engagement portions may be oriented so as to be side by side within the passageway. More preferably, however, a first engagement portion may be located closer to the inlet end of the passageway, while a second engagement portion may be located closer to the outlet end of the passageway. The pair of engagement portions may be oriented in the same direction, or may be oriented in opposite directions to one another (for instance, facing towards one another or facing away from one another). More specifically, the array of projections provided on each engagement portion may be oriented in the same direction, or in different directions to one another. For instance, the engagement portions may be oriented such that the arrays of projections are facing towards one another or are facing away from each other.

In a preferred embodiment of the invention, the array of projections on the engagement portion located closer to the inlet of the body of the clasp may be oriented to face towards the inlet, while the array of projections on the engagement portion located closer to the outlet of the body of the clasp may be oriented to face towards the outlet.

Preferably, the engagement portions may be retained in the engaged position by one or more biasing members. Thus, it is envisaged that the natural bias of the one or more biasing members retains the engagement portions in the engaged position. Any suitable biasing members may be used, such as one or more compressible tubes or the like. More preferably, the one or more biasing members comprise one of more springs. In this embodiment of the invention, it is envisaged that a portion of the actuation portion may abut or engage with the biasing members. Thus, in this embodiment of the invention, actuation of the actuation portion may result in the natural bias of the biasing members being overcome, and the engagement portions being moved from the engaged position to the disengaged position, thereby allowing movement of the elongate member within the passageway.

The engagement portions may move between the engaged and disengaged positions in any suitable manner. For instance, the engagement members may be lifted or lowered between the engaged and disengaged positions, or may slide between the engaged and disengaged positions. In a preferred embodiment of the invention, however, the engagement portions are associated with the biasing members in such a manner that the actuation of the actuation portion results in the engagement portions pivoting between the engaged and disengaged positions. The engagement portions may pivot in any suitable manner. However, in embodiments of the invention in which the engagement portions are oriented to face in different directions to one another in the passageway, it is envisaged that a first engagement portion may pivot in a clockwise direction between the engaged and disengaged positions, while a second engagement portion may pivot in an anticlockwise direction between the engaged and disengaged positions.

By providing at least a pair of engagement portions, the ability of the clasp to retain the elongate member and prevent unwanted movement of the elongate member while in the engaged position is improved. In addition, by providing a pair of engagement portions, disengagement of the engagement portions from the elongate member (and movement of the engagement portions into the disengaged position) may be more easily achieved. In addition, movement of the engagement portions into the disengaged position is achieved in a manner that more effectively moved the engagement portions out of the way of the elongate member, and allows for easy movement of the elongate member in either direction within the passageway. In this way, the risk of accidental strangulation of an animal wearing a collar including the clasp may be reduced, or even prevented.

In a preferred embodiment of the invention, the clasp may be provided with attachment means. The attachment means may be of any suitable form, shape, size or configuration. The attachment means may be adapted to allow an item to be permanently or temporarily attached thereto (such as an animal leash, identification tag or the like).

The object located in the passageway may be any suitable object. In some embodiments of the invention, however, the object comprises one or more elongate members, such as a belt or strap for clothing, a belt or strap for safety equipment (e.g. a vehicle or aeroplane seatbelt, a safety harness strap or the like), a cord, rope, chain or a collar for an animal and so on. Alternatively, in situations in which the clasp is held in a fixed position, the attachment means may be used to attach the clasp to a any suitable fixed object. The attachment means may comprise a hook, loop, screw, bolt, clamp, projection or the like, or any combination thereof.

The clasp may be constructed from any suitable material, such as metal, plastic, fiberglass or the like. The individual components of the clasp may be constructed from the same, or different materials. The clasp may be manufactured in a variety of sizes or shapes, depending on the application in which it is to be used.

In another aspect, the invention resides broadly in a collar, the collar comprising at least one elongate member and a clasp having a body defining at least one passageway extending at least partially therethrough, engagement portions pivotally mounted across the body and adapted to engage an object located in said at least one passageway, and actuation portion in communication with the engagement portions and biased in the engaged condition, wherein actuation of said actuation portion causes the engagement portions to disengage from the object against the biasing force.

Preferably, the elongate member comprises a strap (such as a metal, fabric, plastic or leather strap), rope, cord, belt, chain or the like. Preferably, the elongate member comprises the portion of the collar that is placed around the neck of the wearer. Although the term "collar" has been used in this context, the skilled addressee will understand that the collar could equally be applied to a wearer's arm, leg, torso, waist, head or any other suitable location.

In a most preferred embodiment of the invention, the collar is a collar for an animal.

In yet another aspect, the invention resides broadly in a method of attaching a collar to an animal, the method comprising the steps of actuating an actuation portion located on a clasp provided on said collar, inserting an elongate portion of the collar into the clasp, releasing the actuation portion when the elongate portion has been inserted a sufficient distance into the clasp, wherein releasing the actuation portion causes at least a pair of engagement portions to engage with the elongate portion, thereby preventing the elongate portion from moving when in use.

In another aspect, the invention resides broadly in a clasp having
 a body defining at least one passageway extending from an inlet at a first end of the body to an outlet at a second, opposite end of the body, the second end of the body adapted to secure an elongate member to the body of the clasp, said body comprising a bottom wall, one or more walls extending upward from said bottom wall, the interior of the one or more walls serving to define the passageway,
 at least a pair of engagement portions pivotally mounted across the body and adapted to engage the elongate member when located in said at least one passageway,
 an actuation portion in communication with the engagement portions and biased into an engaged condition,
 wherein actuation of said actuation portion causes the engagement portions to disengage from the elongate member against the biasing force.

The actuation portion may be of any suitable form. As previously stated, the actuation portion is in communication with the engagement portions, and the communication between the actuation portion and the engagement portions may be achieved using any suitable technique. The actuation portion may communicate either directly or indirectly with the engagement portions. For instance, the actuation portion may be located remotely from the engagement portions (or even remotely from the clasp), or the actuation portion and the engagement portions may be physically connected to one another, either temporarily or permanently.

In some embodiments of the invention, the actuation portion comprises a lever, button, switch, latch, or the like. The actuation portion may be located remotely from the clasp or may be mounted permanently or temporarily to the body of the clasp. The actuation portion may be formed integrally with the body of the clasp or may be formed separately and subsequently mounted thereto using any suitable technique. In some embodiments of the invention, at least a portion of the actuation portion may form at least a portion of an upper wall of the body of the clasp.

In a preferred embodiment of the invention, the actuation portion is biased into the engaged condition. By this it is meant that, when the actuation portion is not being actuated, the actuation portion is biased such that the engagement portions are in position to engage the elongate member. Preferably, when the engagement portions are in position to engage the elongate member, the engagement portions are located within the passageway.

In some embodiments of the invention, when the engagement portions are located in the passageway (i.e. when the actuation portion is in the biased condition), the passageway may be at least partially blocked by the engagement portions. Preferably, when the engagement portions are located in the passageway, the elongate member cannot pass through the passageway due to the obstacle caused by the location of the engagement portions. The actuation portion may be biased into this condition using any suitable biasing member, such as a compressible tube or the like. In a preferred embodiment of the invention, however, the biasing member comprises one or more springs.

In a preferred embodiment of the invention, the biasing force of the biasing member may be overcome by manual pressure applied by a user's fingers or hands. However, depending on the application to which the invention is applied, it may be preferable that a greater (or lesser) force than this is required to overcome the biasing force and actuate the actuation portion.

In some embodiments of the invention, actuation of the actuation portion may result in the engagement portions moving such that they no longer obstruct the passageway or only partially obstruct the passageway. In this way, upon actuation of the actuation portion, the elongate member may be inserted into, and pass through, the passageway. When the actuation of the actuation portion is released, the actuation portion is biased so as to return the engagement portions to the engaged condition within the passageway, whereupon, if the elongate member has been inserted into the passageway, the engagement portions engage with said elongate member to retain it in place. In some embodiments of the invention, this movement of the engagement portions is achieved by mounting the engagement portions and the actuation portion so as to be pivotally mounted to the body of the clasp. Thus, actuation of the actuation portion causes the engagement portions to pivot about a pivot point such that the engagement portion is pivoted out of the passageway. In embodiments of the invention in which the actuation portion and the engagement portions are operatively associated with one another, actuation of the actuation portion results in pivotal movement of both the engagement portions and the actuation portion about the pivot point. Alternatively, the engagement portions and the actuation portion may pivot about different pivot points.

The pivot point may be located at any suitable location relative to the actuation portion and/or the engagement portion. In a preferred embodiment of the invention, a pivot pin may be provided at the pivot point about which the engagement portions pivot. Preferably, the pivot pin may be attached to at least one wall of the body so that the engagement portions pivot about the stationary pivot pin. In this embodiment of the invention, it is envisaged that the pivot pin may be attached to opposed walls of the body, and preferably opposed walls extending upwardly from the bottom wall of the body. In some embodiments of the invention, the pivot pin may be at least partially surrounded by the actuation portion. In a preferred embodiment of the invention, the actuation portion may be provided with a passage therethrough into which the pivot pin may be inserted for attachment to opposed walls of the body.

In some embodiments of the invention, the actuation portion may be provided with one or more indicia to instruct a user in how to actuate the actuation portion. The one or more indicia may be in the form of words, letters, numbers, symbols, pictures, colours, a thumb pad or any combination thereof.

The engagement portions may be of any suitable form to create a sufficient engagement between the engagement portions and the elongate member to prevent the elongate member from moving without the engagement portions being disengaged. The physical engagement may be achieved using any suitable technique such as by abutting, a frictional engagement, a pin and slot arrangement, a clamping motion or a combination thereof.

The engagement portions may be provided with one or more projections (teeth, hooks, spikes or the like), an adhesive, Velcro or the like (or any combination thereof) that may physically engage and hold the elongate member during use.

In some embodiments of the invention, the engagement portions may include an array of projections. The array of projections may be provided on a member that extends transversely across at least a portion of the passageway.

When the engagement portions are in the engaged position, the array of projections may extend at least partially into the passageway. In this way, the array of projections may engage with at least a portion of the width of the elongate member located in the passageway.

In a preferred embodiment of the invention, the actuation of the actuation portion may cause the array of projections to move such that the array of projections does not project into the passageway. In this manner, the array of projections may be disengaged from the elongate member located in the passageway so that the elongate member may be removed from the passageway or have its position adjusted. In addition, by moving the array of projections out of the passageway, the elongate member may be inserted into the passageway past the engagement portions if required.

In a preferred embodiment of the invention, the member on which the array of projections is provided may be in communication with the actuation portion. Preferably, the member is connected, either fixedly or removably, or directly or indirectly, to the actuation portion.

The pair of engagement portions may be oriented in any suitable manner within the body of the clasp. For instance, the engagement portions may be oriented so as to be side by side within the passageway. More preferably, however, a first engagement portion may be located closer to the inlet end of the passageway, while a second engagement portion may be located closer to the outlet end of the passageway. The pair of engagement portions may be oriented in the same direction, or may be oriented in opposite directions to one another (for instance, facing towards one another or facing away from one another). More specifically, the array of projections provided on each engagement portion may be oriented in the same direction, or in different directions to one another. For instance, the engagement portions may be oriented such that the arrays of projections are facing towards one another or are facing away from each other.

In a preferred embodiment of the invention, the array of projections on the engagement portion located closer to the inlet of the body of the clasp may be oriented to face towards the inlet, while the array of projections on the engagement portion located closer to the outlet of the body of the clasp may be oriented to face towards the outlet.

Preferably, the engagement portions may be retained in the engaged position by one or more biasing members. Thus, it is envisaged that the natural bias of the one or more biasing members retains the engagement portions in the engaged position. Any suitable biasing members may be used, such as one or more compressible tubes or the like. More preferably, the one or more biasing members comprise one of more springs. In this embodiment of the invention, it is envisaged that a portion of the actuation portion may abut or engage with the biasing members. Thus, in this embodiment of the invention, actuation of the actuation portion may result in the natural bias of the biasing members being overcome, and the engagement portions being moved from the engaged position to the disengaged position, thereby allowing movement of the elongate member within the passageway.

The engagement portions may move between the engaged and disengaged positions in any suitable manner. For instance, the engagement members may be lifted or lowered between the engaged and disengaged positions, or may slide between the engaged and disengaged positions. In a preferred embodiment of the invention, however, the engagement portions are associated with the biasing members in such a manner that the actuation of the actuation portion results in the engagement portions pivoting between the engaged and disengaged positions. The engagement portions may pivot in any suitable manner. However, in embodiments of the invention in which the engagement portions are oriented to face in different directions to one another in the passageway, it is envisaged that a first engagement portion may pivot in a clockwise direction between the engaged and disengaged positions, while a second engagement portion may pivot in an anticlockwise direction between the engaged and disengaged positions. Preferably, the engagement portions are mounted to pins that extend between opposed side walls of the body, thereby forming pivot points about which the engagement portions pivot. Preferably, each engagement portion is mounted to a separate pin.

By providing at least a pair of engagement portions, the ability of the clasp to retain the elongate member and prevent unwanted movement of the elongate member while in the engaged position is improved. In addition, by providing a pair of engagement portions, disengagement of the engagement portions from the elongate member (and movement of the engagement portions into the disengaged position) may be more easily achieved. In addition, movement of the engagement portions into the disengaged position is achieved in a manner that more effectively moved the engagement portions out of the way of the elongate member, and allows for easy movement of the elongate member in either direction within the passageway. In this way, the risk of accidental strangulation of an animal wearing a collar including the clasp may be reduced, or even prevented.

In a preferred embodiment of the invention, the clasp may be provided with an attachment portion. The attachment portion may be of any suitable form, shape, size or configuration. The attachment portion may be adapted to allow an item to be permanently or temporarily attached thereto (such as an animal leash, identification tag or the like). Alternatively, in situations in which the clasp is held in a fixed position, the attachment portion may be used to attach the clasp to a any suitable fixed object. The attachment portion may comprise a hook, loop, screw, bolt, clamp, projection or the like, or any combination thereof.

The elongate member may be of any suitable form. In some embodiments of the invention, however, the elongate member comprises one or more belts or straps for clothing, a belt or strap for safety equipment (e.g. a vehicle or aeroplane seatbelt, a safety harness strap or the like), a belt or strap for a vehicle tie-down (such as a truck or the like) a cord, rope, chain or a collar for an animal and so on.

The clasp may be constructed from any suitable material, such as metal, plastic, fiberglass or the like. The individual components of the clasp may be constructed from the same, or different materials. The clasp may be manufactured in a variety of sizes or shapes, depending on the application in which it is to be used.

In some embodiments of the invention, the bottom wall of the body may be substantially continuous. In this embodiment of the invention, a substantially continuous bottom wall ensures that the elongate member must pass through the inlet at the first end of the body and exit the clasp through the outlet located at the second end of the body.

It will be understood that the term "substantially continuous" is intended to mean that the bottom wall is not provided with apertures large enough for the elongate member to pass through. However, the bottom wall may still be provided with one or more apertures therein that are not large enough for the elongate member to pass through. For instance, the bottom wall may be provided with one or more apertures therein through which one or more securing members may pass to secure the elongate member to the body. The securing members may be of any suitable form, although in a preferred embodiment the securing members may comprise one or more mechanical fasteners, such as bolts, screws, rivets, nails or the like, or a combination thereof. In this embodiment of the invention it is envisaged that the elongate member may be provided with one or more apertures therethrough that may be aligned with the one or more apertures in the bottom wall to allow a securing member to pass through the aligned apertures and secure the elongate member to the body.

Alternatively, the bottom wall of the body may be non-continuous. However, in order to ensure that the elongate member passes through the inlet at the first end of the body and exits the clasp through the outlet located at the second end of the body, at least a portion of the bottom wall may be shaped so as to guide the elongate member along the passageway and prevent it from exiting the clasp through an aperture in the bottom wall. In this embodiment of the invention, at least a portion of the bottom wall may be provided at an angle to the remainder of the bottom wall so as to direct the elongate member along the passageway. The at least a portion of the bottom wall may be provided at any suitable angle to the remainder of the bottom wall, although in a preferred embodiment of the invention the at least a portion of the bottom wall may be angled into the passageway so as to ensure that the elongate member is directed through the passageway.

In this embodiment of the invention, it is envisaged that the end of the elongate member to be secured to the body may pass through the aperture to form a loop. The looped portion of the elongate member may then be secured to itself using one or more securing members. Once secured, the elongate member is effectively secured to the body of the clasp.

Preferably, the body of the clasp comprises a first end and a second end. Preferably, the first end of the body is the end at which the inlet of the passageway is located, while the second end of the body is the end at which the outlet of the passageway is located. In some embodiments of the invention, the elongate member may be secured at or adjacent the second end of the body. In this embodiment, an opposite end of the elongate member to that secured at or adjacent the second end of the body may then be inserted into the clasp through the inlet at the first end of the body.

In some embodiments of the invention, the clasp may further be provided with a guide portion. Preferably, the guide portion is adapted to assist in guiding the elongate member through the passageway, thereby improving the ease with which the clasp may be used. The guide portion may be of any suitable form. However, in a preferred embodiment of the invention, the guide portion may be associated with the actuation portion. Thus, in this way, actuation of the actuation portion produces a corresponding movement in the guide portion. In particular embodiments of the invention, actuation of the actuation portion results in pivotal movement of both the actuation portion and the guide portion about the pivot point.

In a preferred embodiment of the invention, the guide portion may be located on the actuation portion. In this embodiment, the guide portion may be located on a rear portion of the actuation portion. The guide portion may be fixedly or removably attached to the rear portion of the actuation portion. By "rear portion" it is meant that the guide portion may be located on a portion of the actuation portion that faces inwardly towards the passageway rather than outwardly towards a user. Preferably, if the elongate member comes into contact with the guide portion as it passes through the passageway, the shape of the guide portion will direct the elongate member towards the engagement portions. In this way, the ease of use of the clasp may be improved.

In yet another aspect, the invention resides broadly in a method of attaching a collar to an animal, said collar comprising a clasp and an elongate member, the method comprising the steps of:

actuating an actuation portion located on a clasp provided on said collar, said clasp having a body defining a passageway extending from a first end of the body to a second end of the body, said body comprising one or more walls, the interior of the walls serving to define the passageway, securing an end of the elongate member to the clasp at the second end of the body of the clasp, inserting an opposite end of the elongate member into the clasp through an inlet at the first end of the body, the inlet being defined by the body and the actuation portion, toward the second end of the body of the clasp, releasing the actuation portion when the elongate member has been inserted a sufficient distance into the clasp, wherein releasing the actuation portion causes at least a pair of engagement portions to engage with the elongate member, thereby preventing the elongate member from moving when in use.

In another aspect, the invention resides broadly in a clasp having:

a body defining at least one passageway extending from an inlet at a first end of the body to an outlet at a second, opposite end of the body, the second end of the body adapted to secure an elongate member to the body of the clasp, said body comprising a bottom wall, one or more walls extending upward from said bottom wall, the interior of the one or more walls serving to define the passageway, at least a pair of engagement portions pivotally mounted across the body and adapted to engage the elongate member when located in said at least one passageway, an actuation portion in communication with the at least a pair of engagement portions and biased into an engaged condition, wherein actuation of said actuation portion causes the engagement portions to disengage from the elongate member against the biasing force.

In another aspect, the invention resides broadly in a method of attaching a collar to an animal, said collar comprising a clasp and an elongate member, the method comprising the steps of:

actuating an actuation portion located on a clasp provided on said collar, said clasp having a body defining a passageway extending from a first end of the body to a second end of the body, said body comprising one or more walls, the interior of the walls serving to define the passageway, securing an end of the elongate member to the clasp at the second end of the body of the clasp, inserting an opposite end of the elongate member into the clasp through an inlet at the first end of the body, the inlet being defined by the body and the actuation portion, toward the second end of the body of the clasp, releasing the actuation portion when the elongate member has been inserted a sufficient distance into the clasp, wherein releasing the actuation portion causes at least a pair of engagement portions to engage with the elongate member, thereby preventing the elongate member from moving when in use.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
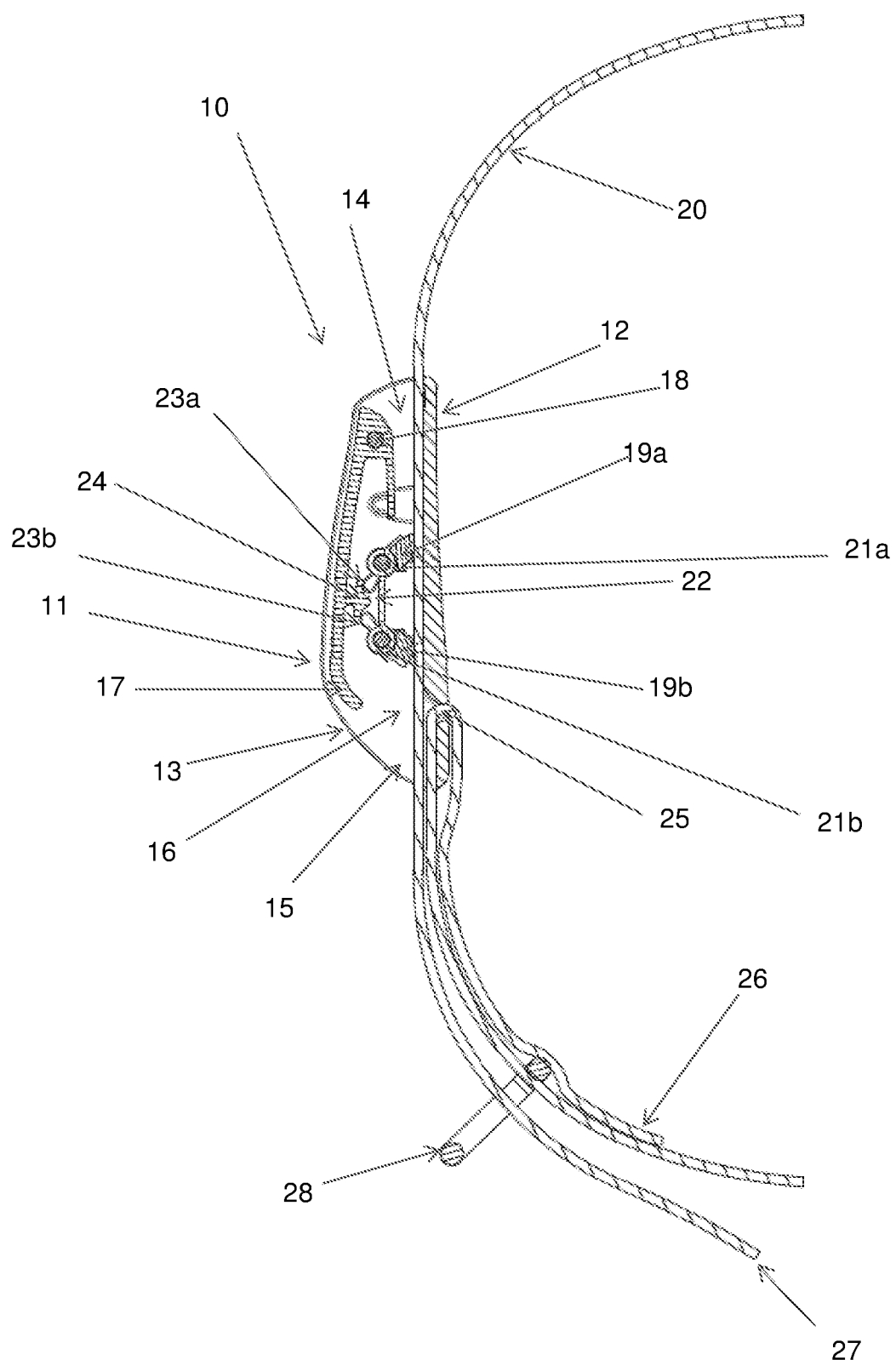
FIG. 1 illustrates a cross-sectional view of a clasp according to an embodiment of the present invention.

In FIG. 1 there is shown a cross-sectional view of a clasp 10 according to an embodiment of the present invention. The clasp 10 of FIG. 1 is shown in the engaged position.

In this Figure it may be seen that the clasp 10 comprises a body 11 having a bottom wall 12 and side walls 13 that extend upwardly from the bottom wall 12. An inlet 14 is located at a first end of the body 11, while an outlet 15 is located at a second end of the body 11, and a passageway 16 is formed through the body 11 between the inlet 14 and the outlet 15.

The clasp 10 further includes an actuation portion 17 pivotally connected to the body 11 via pivot pin 18 that extends between opposed side walls 13. A pair of engagement portions 19a, 19b are located within the passageway 16 and, in the engaged position shown in FIG. 1, engage with an elongate member 20 in the form of a strap positioned within the passageway 16.

The engagement portions 19a, 19b are pivotally connected to the body 11 via pivot pins 21a, 21b that extend between opposed side walls 13. Also connected to the pivot pins 21a, 21b is a biasing member 22 in the form of a spring. The natural bias of the biasing member 22 retains the engagement portions 19a, 19b in the engaged position illustrated in FIG. 1.

The engagement portions 19a, 19b are further provided with projections 23a, 23b that abut an abutment portion 24 of the actuation portion 17.

In FIG. 1 it may be seen that the elongate member 20 is connected to the second end of the body 11 adjacent the outlet 15. The elongate member 20 is connected to the body 11 by passing a first end 26 of the elongate member 20 through an aperture 25 in the bottom wall 12 of the body and securing the end of the elongate member 20 to another part of the elongate member 20. In use, an opposed second end 27 of the elongate member 20 is inserted into the inlet 14 of the body through the passageway 16 and out of the outlet 15 thereby forming a loop.

The clasp 10 further comprises attachment means in the form of a loop 28 to which another object (such as a leash, identification tag or the like) may be attached.

Figure 2:
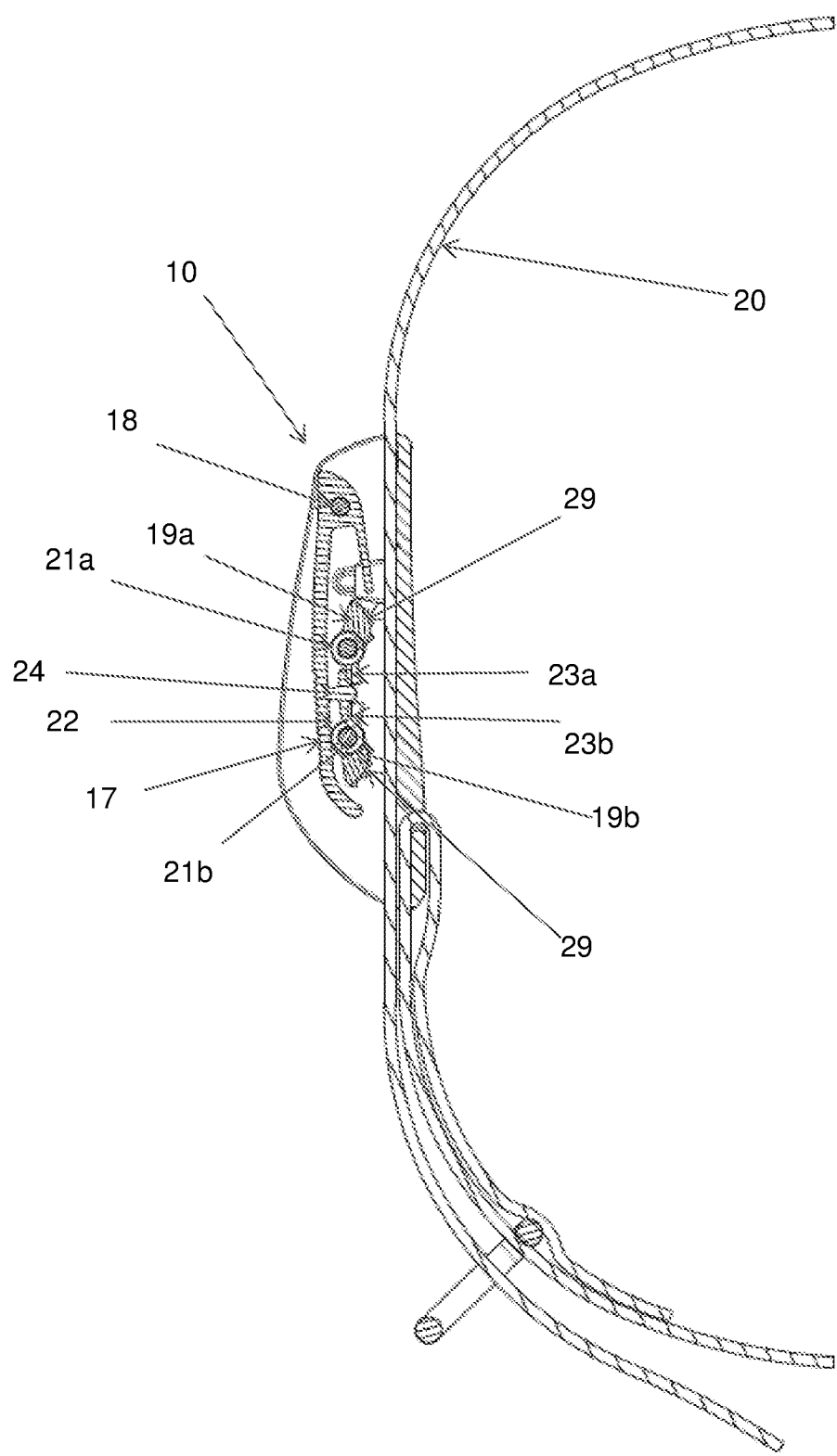
FIG. 2 illustrates a cross-sectional view of a clasp according to an embodiment of the present invention.

In FIG. 2 there is illustrated a cross-sectional view of a clasp 10 according to an embodiment of the present invention. The clasp 10 is virtually identical to the one illustrated in FIG. 1 except that the clasp 10 of FIG. 2 is shown in the disengaged position.

In FIG. 2, pressure has been applied to the actuation portion 17, forcing the actuation portion 17 to pivot downwardly about pivot pin 18. The downward movement of the actuation portion 17 results in the abutment portion 24 exerting a force on the projections 23a, 23b, overcoming the natural bias of the biasing member 22 and causing the engagement portions 19a, 19b to pivot about pivot pins 21a, 21b. One engagement portion 19a pivots in an anticlockwise direction when moving from the engaged position to the disengaged position, while the other engagement portion 19b pivots in a clockwise direction when moving from the engaged position to the disengaged position.

The pivotal movement of the engagement portions 19a, 19b removes the engagement portions 19a, 19b from their engagement with the elongate member 20, thereby allowing adjustment of the position of the elongate member 20 in either direction.

In FIG. 2 it may be more clearly seen that each engagement portion 19a, 19b is provided with an array of projections 29 that engage with the elongate member 20 in the engaged position, thereby precluding unwanted movement of the elongate member 20.

Figure 3:
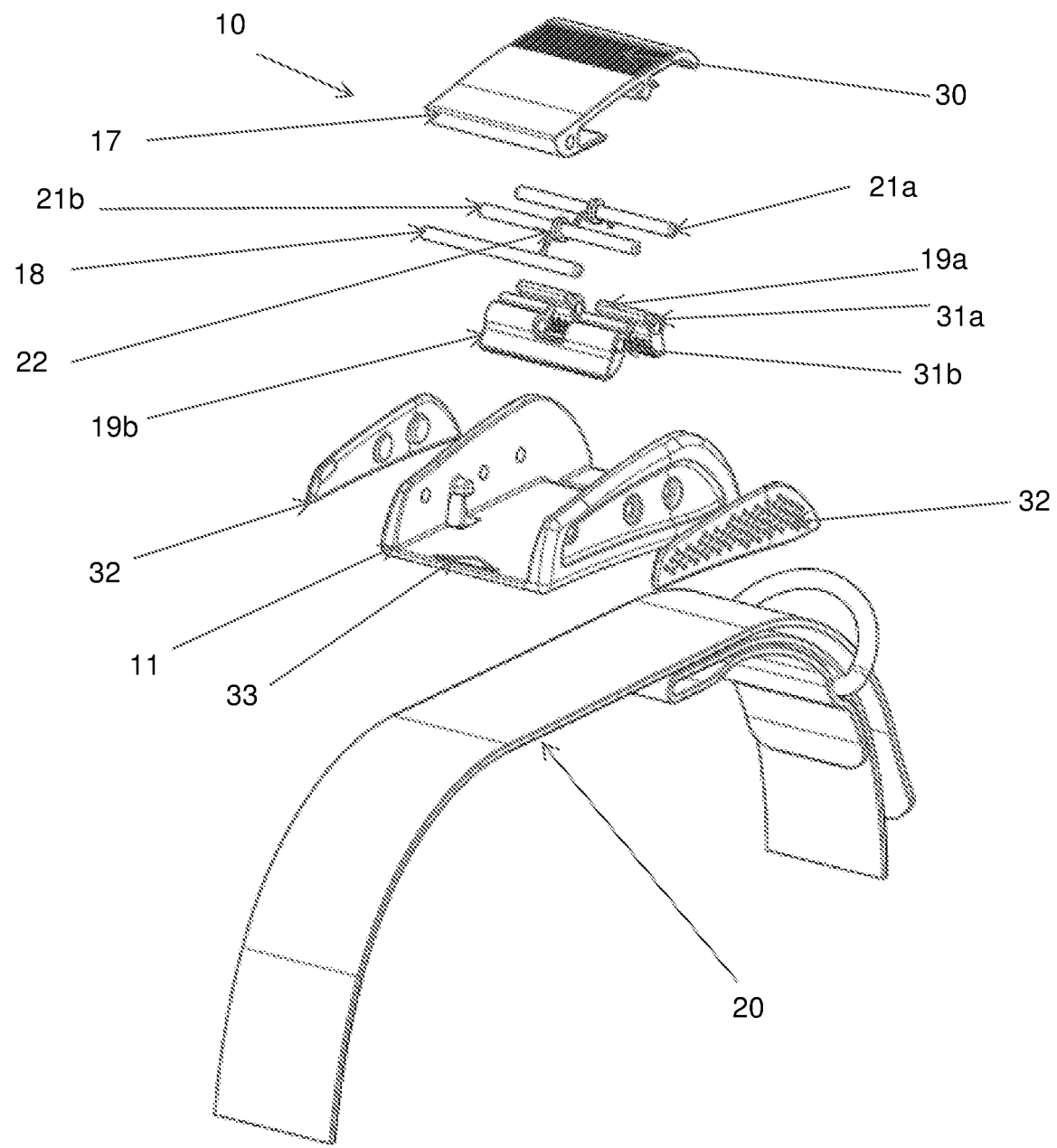
FIG. 3 illustrates an exploded view of a clasp according to an embodiment of the present invention.

In FIG. 3, and exploded view of a clasp 10 according to an embodiment of the present invention is shown. In this Figure, it may be seen that the actuation portion 17 includes a thumb pad 30 adapted to indicate to a user where to place their thumb or finger so as to apply a force and disengage the engagement portions 19a, 19b from the elongate member 20.

The engagement portions 19a, 19b extend substantially entirely across the width of the body 11, meaning that the elongate member 20 is engaged by the engagement members 19a, 19b across substantially its entire width. In addition, the engagement portions 19a, 19b are provided with bores 31a, 31b therethrough to ensure that the engagement portions 19a, 19b are retained on pivot pins 21a, 21b.

The biasing member 22 is mounted on both pivot pins 21a and 21b and extends therebetween. In addition, the biasing member is provided with tail portions that abut the engagement portions 19a, 19b and retain the engagement portions 19a, 19b in the engaged condition due to the natural bias of the biasing member 22.

The side walls 13 are provided with cover portions 32 that serve to retain the pivot pins 18, 21a and 21b in place in the clasp 10. In addition, the cover portions 32 provide the clasp 10 with a pleasing aesthetic appearance.

Further, the clasp 10 is provided with indicia 33 in the form of an arrow to indicate to a user the direction in which the elongate member 20 is to be inserted into the clasp 10.

Figure 4:
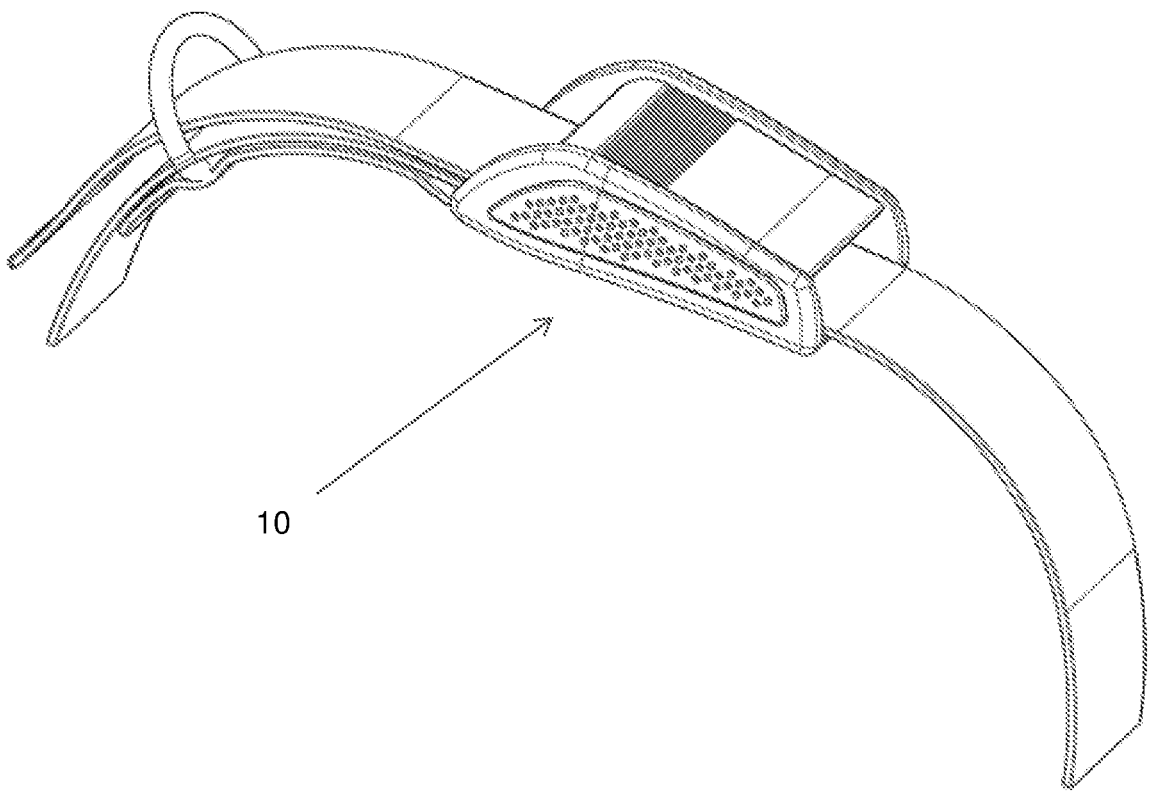
FIG. 4 illustrates an isometric view of a clasp according to an embodiment of the present invention.

In FIG. 4 there is illustrated an isometric view of a clasp 10 according to an embodiment of the present invention. In this Figure, the clasp 10 of FIG. 3 is shown in an assembled condition. Furthermore, the clasp is shown in the engaged condition.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A clasp, comprising:
a body defining at least one passageway extending at least partially therethrough; and
a pair of engagement portions pivotally mounted across the body and configured to engage, via a biasing force, an object located in the at least one passageway, wherein
each engagement portion of the pair of engagement portions is independently pivotally mounted across the body and is independently configured to pivot relative to the other engagement portion of the pair of engagement portions,
a first of the pair of engagement portions is located and is pivotally mounted closer to an inlet end of the passageway and a second of the at least one pair of engagement portions is located and is pivotally mounted closer to an outlet end of the passageway,
a pair of pivot pins,
a first of the pair of pivot pins pivotally connecting the first of the pair of engagement portions to the body, the first of the pair of engagement portions including a first bore receiving and retaining the first of the pair of pivot pins,
a second of the pair of pivot pins pivotally connecting the second of the pair of engagement portions to the body, the second of the pair of engagement portions including a second bore receiving and retaining the second of the pair of pivot pins,
a biasing member configured to provide the biasing force having a first portion, a second portion, and a third portion, the first portion extending around the first pivot pin, the second portion extending around the second pivot pin, and the third portion extending between the first and second pivot pins, and the third portion connecting the first and second portions together, and
the clasp further comprises an actuation portion, the actuation portion comprising an abutment portion in operable communication with the pair of engagement portions such that actuation of the actuation portion results in the abutment portion exerting a force on the pair of engagement portions and causes the pair of engagement portions to independently pivot relative to the actuation portion to disengage from the object against the biasing force.

2. A clasp according to claim 1, wherein the object comprises an elongate flexible member.

3. A clasp according to claim 1, wherein the actuation portion comprises a lever, button, switch or latch.

4. A clasp according to claim 1, wherein the actuation portion forms at least a portion of an upper wall of the body.

5. A clasp according to claim 1, wherein the biasing member is a spring.

6. A clasp according to claim 1, wherein the actuation portion is pivotally mounted to the body of the clasp.

7. A clasp according to claim 6, wherein actuation of the actuation portion causes the engagement portions to pivot about a pivot point such that the engagement portions are pivoted out of the passageway.

8. A clasp according to claim 7, wherein, as the engagement portions pivot out of the passageway, the first of the pair of engagement portions pivots in a clockwise direction between an engaged position and a disengaged position, and the second of the pair of engagement portions pivots in an anticlockwise direction between an engaged position and a disengaged position.

9. A clasp according to claim 1, wherein each of the pair of engagement portions is provided with an array of projections configured to engage with the object.

10. A clasp according to claim 9, wherein the array of projections on the first of the pair of engagement portions is oriented in a different direction to the array of projections on the second of the pair of engagement portions.

11. A clasp according to any claim 1, wherein the actuation portion is provided with indicia to instruct a user how to actuate the actuation portion.

12. A clasp according to claim 1, wherein the clasp and at least one elongate member are included on a collar.

13. A clasp according to claim 12, wherein the elongate member comprises the portion of the collar that is configured to be placed around a neck of a wearer.

14. A clasp according to claim 12, wherein the collar is an animal collar.

15. A clasp, comprising:
a body defining at least one passageway extending from an inlet at a first end of the body to an outlet at a second end, opposite the first end of the body, the second end of the body configured to secure an elongate member to the body of the clasp, the body comprising:
a bottom wall, and
one or more walls extending upward from the bottom wall, an interior of the one or more walls serving to define the at least one passageway;
a pair of engagement portions pivotally mounted across the body and configured to engage, via a biasing force, the elongate member when located in the at least one passageway, wherein a first of the pair of engagement portions is located and is pivotally mounted closer to the first end of the body and a second of the pair of engagement portions is located and is pivotally mounted closer to the second end of the body; and
each engagement portion of the pair of engagement portions is independently pivotally mounted across the body and is independently configured to pivot relative to the other engagement portion of the pair of engagement portions,
a pair of pivot pins,
a first of the pair of pivot pins pivotally connecting the first of the pair of engagement portions to the body, the first of the pair of engagement portions including a first bore receiving and retaining the first of the pair of pivot pins,
a second of the pair of pivot pins pivotally connecting the second of the pair of engagement portions to the body, the second of the pair of engagement portions including a second bore receiving and retaining the second of the pair of pivot pins,
a biasing member configured to provide the biasing force having a first portion, a second portion, and a third portion, the first portion extending around the first pivot pin, the second portion extending around the second pivot pin, and the third portion extending between the first and second pivot pins, and the third portion connecting the first and second portions together, and
an actuation portion comprising an abutment portion in operable communication with the pair of engagement portions such that actuation of the actuation portion results in the abutment portion exerting a force on the pair of engagement portions and causes the pair of engagement portions to independently pivot relative to the actuation portion to disengage from the elongate member against the biasing force.

16. A clasp according to claim 15, wherein the clasp is provided with an attachment portion configured to allow an item to be permanently or temporarily attached thereto.

17. A clasp according to claim 15, wherein the bottom wall of the body is substantially continuous.

18. The clasp according to claim 15, the pair of pivot pins each extending between opposed walls of the one or more walls extending upward from the bottom wall, wherein the pair of pivot pins are fixed.

19. A collar comprising an elongate member secured to the clasp of claim 15.

20. The collar of claim 19, wherein the collar is an animal collar.

* * * * *